May 19, 1970 J. S. SEKHON 3,512,446
COUNTERSINK FASTENERS
Filed Oct. 7, 1968
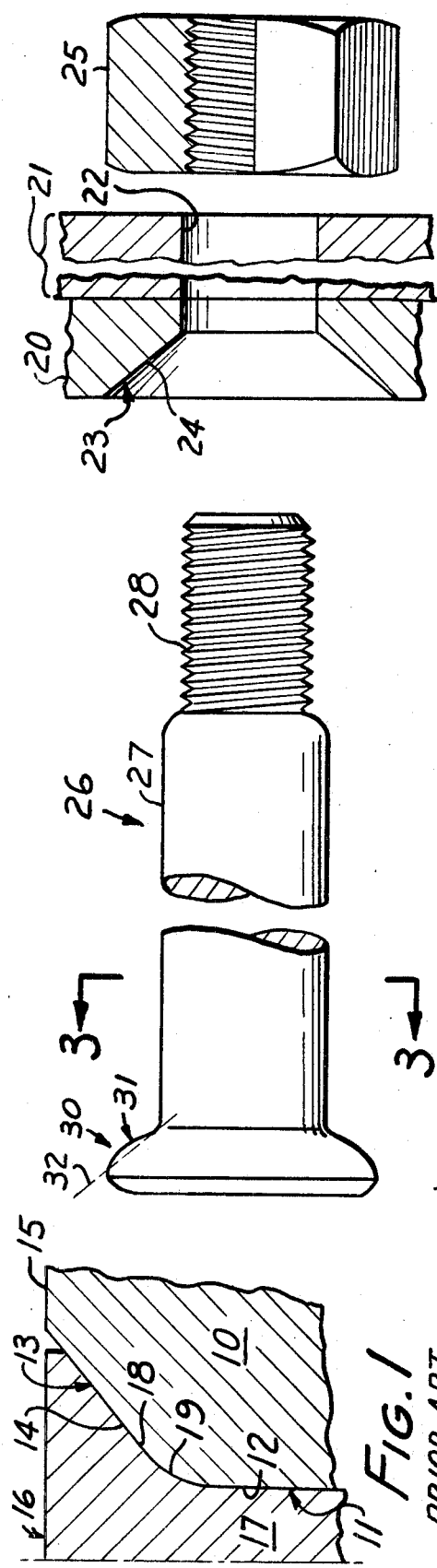
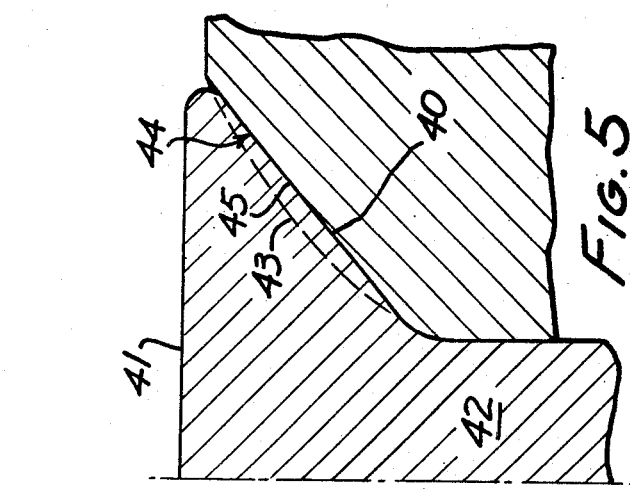
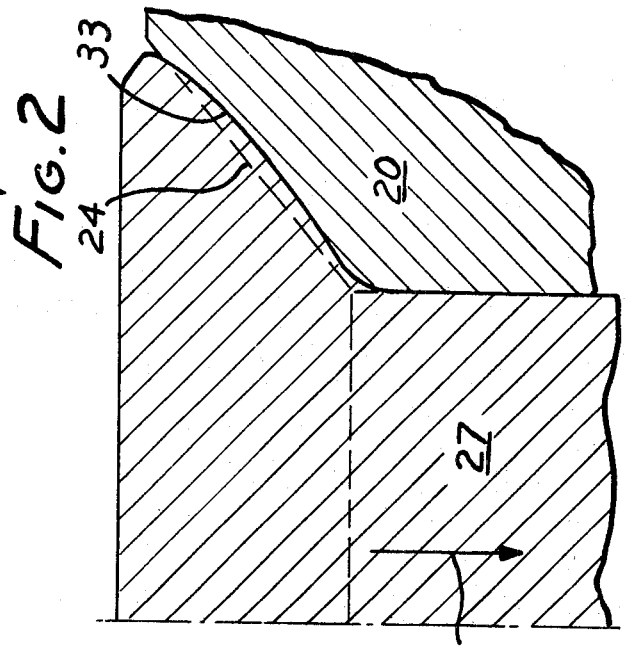
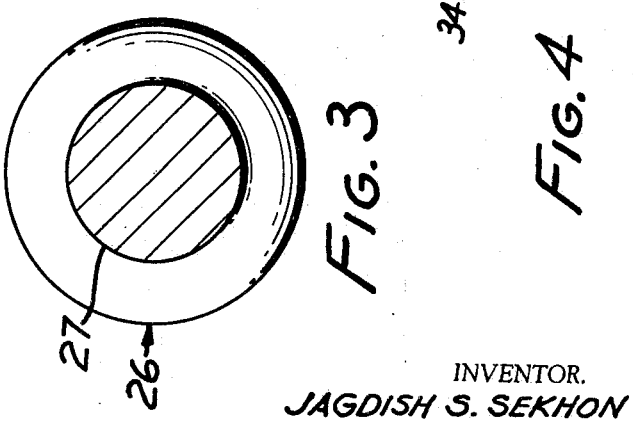
INVENTOR.
JAGDISH S. SEKHON
BY
ATTORNEYS.

United States Patent Office 3,512,446
Patented May 19, 1970

3,512,446
COUNTERSINK FASTENERS
Jagdish S. Sekhon, Torrance, Calif., assignor to Hi-Shear Corporation, Torrance, Calif., a corporation of California
Filed Oct. 7, 1968, Ser. No. 765,521
Int. Cl. F16b 5/02, 35/00
U.S. Cl. 85—9                                         2 Claims

ABSTRACT OF THE DISCLOSURE

Countersink fasteners such as headed bolts, nuts and bins in combination with a workpiece having a countersink surface, wherein the fatigue life of the assembly is improved by forming one or the other of the countersink surfaces in a configuration of non-congruency so that material must be displaced in order for the fastener to be installed.

---

This invention relates to countersink type fasteners such as headed rivets, bolts, or pins, for example.

It is common practice in the prior art to form a hole in a workpiece to receive the shank of a fastener element and at one end of the hole to provide a countersink surface against which the countersink surface of a head on the shank will abut. These countersink surfaces are customarily congruent to each other and intentionally make a full surface-to-surface contact with each other.

The use of radial compressive stresses in the main body of a hole in order to improve fatigue life of the structure is becoming a practice when building relatively high-performance structures such as aircraft frames and the like. These radial compressive stresses are caused by interference fits between the shank and the wall of the hole, and by certain modifications of techniques of making interference fits. The fatigue life of the joint is greatly increased by these techniques. However, no attempt has heretofore been made to create radial compressive stresses in the countersink area of the hole. As a result, most of the fatigue failures in structures originate in the countersink area of a riveted or fastener structure. It is an object of this invention to improve the fatigue life of the structure by creating radial compressive stresses in the countersink area of the assembly.

This invention is accomplished by forming a hole in the workpiece to receive the shank of a fastener and forming one countersink surface in the material around the end of the hole, and another countersink surface on the head of the fastener element, these countersink surfaces being non-congruent and one being convex relative to the other in the sense that the countersink surface on the hole must be deflected by the countersinkk surface on the fastener element in order for the fastener element to be seated and installed properly. The result is a compressive radial stress at the countersink area of the hole providing the advantages of interference fits in the region of the countersink.

The foregoing will be fully appreciated from the following detailed description and the accompanying drawings, in which:

FIG. 1 is a fragmentary cross-section showing the prior art;

FIG. 2 is an exploded view of a joint assembly utilizing the invention;

FIG. 3 is a cross-section taken at line 3—3 of FIG. 2;

FIG. 4 shows a fragment of the joint formed from the components of FIG. 2 in its assembled condition; and FIG. 5 shows an alternate configuration of the invention.

FIG. 5 shows the status of the prior art wherein plate 10 has a hole 11 formed therein with a wall 12 which terminates at a countersink 13. This countersink has a frustoconical countersink surface 14 which terminates at the upper face 15 of the plate. A fastener element 16 includes a shank 17 which is cylindrical and may or may not make an interference fit with the wall of hole 11. The fastener element has a countersink head 17 with a frustoconical surface 18 that is congruent to surface 14. A radius 19 is formed at the junctions of the countersinks with their adjacent surfaces to avoid undesirable stress concentrations. It will be seen that pressing the countersink surfaces together will create only relatively small radial compressive stresses, and that substantial diplacement of material within the yield point is unlikely, and displacement beyond that yield point is extremely unlikely.

In order to overcome the limitations of the prior art this invention utilizes the configurations shown in FIGS. 2–5. It is the object of this invention to assemble a workpiece which may be comprised of plates 20 and 21 which have a hole 22 extending therethrough. That part of the hole which is in plate 20 includes a countersink 23 which may conveniently be a frustoconical surface 24 that intersects the cylindrical part of hole 22 inside the plate. An engagement means 25 such as a nut or collar is intended to be attached to fastener element 26 to complete the installation. Fastener element 26 in the illustrated embodiment comprises a threaded pin, but it will be understood that this invention is adaptable to the use of any class of attachment means, and to any shape of shank. The means for holding the joint in its clamped condition is immaterial to the treatment of the countersink end.

The fastener element 26 comprises a shank 27 which is commonly intended to make an interference fit with the wall of hole 22, meaning that the diameter of the shank is greater than the hole diameter which in contiguous to in in the set configuration.

Engagement means 28 comprises a thread which, when the fastener 26 is seated in the hole, will project beyond the back side of plate 21 and be engaged by the threads which will hold the assembly tightly clamped. It will further be understood that the engagement means 28 may be utilized to pull the shank fully into the hole, or compressive means such as a percussive hammer may be used to exert the pulling or percussive forces needed to seat the fastener 26 by displacing the metal.

A countersink head 30 is formed on and is integral with the shank, and includes a countersink face 31 which, however, is not congruent to surface 24. Instead, it is convex relative thereto and comprises a continuous surface of revolution which lies outside a theoretical cone 32 which has the same conical angle as the conical angle of surface 24. For example, in a fastener having a shank diameter on the order of 0.2535", the largest diameter of the base may be on the order of approximately 0.375" and the largest diameter of the countersink on the order of 0.395". The countersink angle may be on the order 50°, and the generator of the surface of revolution a circular arc with a radius on the order of 0.200" centered on a point approximately 0.180" above the joint of the head and the shank, and displaced approximately 0.35" outwardly of the central axis. The effect is that of a gentle bulging face adapted to make a compressive contact with countersink surface 24 when the head is drawn strongly against the countersink surface in plate 20.

The result of the foregoing is shown in FIG. 4 where the initial countersink line of the plate is shown in dashed line, and the resulting contiguous interface is shown by line 33, which is essentially that of the head, the deformation having occurred in the workpiece. The metal surrounding the countersink area will therefore have been compressed both radially outwardly and downwardly by axial forces drawn in the direction of arrow 34.

FIG. 5 illustrates that a countersink surface 40 conical in nature may be formed on head 41 of a shank 42, and an initial non-congruent surface 43 of the same class as that of face 31 in FIG. 2, may be formed on the countersink wall of plate 44. This is shown in dashed line. When the device is seated, then the shape of the countersink face in the plate will be as shown by line 45.

In all cases, the material of the head will be harder than that of the plate in order that the plate material will be deformed by the head to achieve the results illustrated. It will be noted that it is immaterial what is to be the ultimate shape of the interface between the countersink head and the countersink in the plate, provided only that the material of the plate is compressively stressed by the head during the seating action.

Because the tolerances, finish and shape of the head of a fastener can be more closely controlled than those same features of holes in plates, there will be a considerable improvement in the nature of the interface by the reaction between the surfaces, and a result actually equivalent to that of burnishing is effected on the countersink, thereby reducing stress concentration regions in addition to other beneficial results. Furthermore, depending upon the amount of the interference between the two countersink surfaces, cold-working can be attained if the forces exerted are great enough, thereby to provide the localized hardening and increased tensile strength which are attained by exceeding the yield point. These benefits are cumulative to those which are attained merely by stressing the plate within the yield point. This invention comprises both conditions, and the term "displacement of metal" does not necessarily mean inelastic plastic flow.

It has been determined in tests that by the use of the invention shown, improvements in fatigue life on the order of at least 25% and often toward 100% have been attained, which is a considerable advantage in aircraft design. A typical relationship of material is the use of titanium alloy 6AL-4V for the fastener, and the aluminum alloy known as 2024–T351 for the plate, illustrating the use of a harder head than plate.

This invention is not to be limited by the embodiments shown in the drawings and described in the description, which are given by way of example and not of limitation.

What is claimed is:

1. In combination: a metallic workpiece with a hole therein having a countersink surface adjacent to one end thereof; and a fastener having a shank adapted to enter the said hole and a rigid head adapted to bear against said end thereof, a countersink surface on the head facing said end of the hole, both of said countersink surfaces being surfaces of revolution, and being metallic throughout their circumferential and radial extents, said countersink surfaces being of substantially equal radial extent, neither of said countersink surfaces being congruent to the other, and one being convex relative to the other, with the convex surface being smoothly curved throughout substantially its entire radial extent whereby upon the shank's being drawn into the hole, deformation of the countersink on the workpiece beyond its compressive yield point is required as a prerequiste to full seating contiguity of the two countersink surfaces.

2. A countersink joint comprising: a metallic workpiece with a hole therein having a countersink surface adjacent to one end thereof; and a fastener of a metal harder than that of said workpiece having a shank adapted to enter the said hole and a rigid head adapted to bear against said end thereof, a countersink surface on the head facing said end of the hole, both of the said countersink surfaces being surfaces of revolution, and being metallic throughout their circumferential and radial extents, said countersink surfaces being of substantially equal radial extent, neither of said countersink surfaces having been, prior to assembly of the joint, congruent to the other, one being convex relative to the other, with the convex surface being smoothly curved throughout substantially its entire radial extent, the fastener being inserted into the hole and held there with such force that the countersink surface of the head deforms the countersink surface of the workpiece beyond its compressive yield point so the two countersink surfaces become and remain contiguous, congruent, and mutually concave-convex.

References Cited

UNITED STATES PATENTS

| 2,833,325 | 5/1958 | Laisey | 85—9 X |
| 2,982,166 | 5/1961 | Hobbs | 85—9 X |
| 2,995,057 | 8/1961 | Nenzell | 85—9 |

FOREIGN PATENTS

| 997,733 | 7/1965 | Great Britain. |
| 1,112,810 | 5/1968 | Great Britain. |

RAMON S. BRITTS, Primary Examiner

U.S. Cl. X.R.

287—189.36

UNITED STATES PATENT OFFICE
CERTIFICATE OF CORRECTION

Patent No. 3,512,446          Dated  May 19, 1970

Inventor(s)  Jagdish S. Sekhon

It is certified that error appears in the above-identified patent and that said Letters Patent are hereby corrected as shown below:

Column 1, line 13, "bins" should be --pins--

Column 1, line 53, "countersinkk" should be --countersink--

Column 1, line 71, "FIG. 5" should be --FIG. 1--

Column 2, line 12, "diplace-" should be --displace-"

Column 2, line 14, "that" should be --the--

Column 2, line 36, "in" should be --is--

Column 2, line 37, "in" should be --it--

Column 2, line 55, "base" should be --head--

Column 2, lines 57-58, after "order" and "50o" insert --of--

Column 4, line 13, "prerequiste" should be --prerequisite--

SIGNED AND
SEALED
OCT 6 - 1970

(SEAL)
Attest:

Edward M. Fletcher, Jr.
Attesting Officer

WILLIAM E. SCHUYLER, JR.
Commissioner of Patents